United States Patent
Strasser et al.

(10) Patent No.: US 9,551,852 B2
(45) Date of Patent: Jan. 24, 2017

(54) METHOD AND DEVICE FOR SHEATHING A LIGHT GUIDE

(71) Applicants: Wolfgang Strasser, Aham (DE);
Rudolf Aichner, Kirchberg (DE);
Anna-Maria Rauch, Ampfing (DE);
Elena Justus-Bischler, Vilsbiburg (DE)

(72) Inventors: Wolfgang Strasser, Aham (DE);
Rudolf Aichner, Kirchberg (DE);
Anna-Maria Rauch, Ampfing (DE);
Elena Justus-Bischler, Vilsbiburg (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 703 days.

(21) Appl. No.: 14/025,711

(22) Filed: Sep. 12, 2013

(65) Prior Publication Data

US 2014/0069570 A1 Mar. 13, 2014

(30) Foreign Application Priority Data

Sep. 13, 2012 (DE) .......................... 10 2012 216 333

(51) Int. Cl.
*B32B 37/00* (2006.01)
*G02B 6/44* (2006.01)

(52) U.S. Cl.
CPC ............ *G02B 6/4486* (2013.01); *Y10T 156/10* (2015.01); *Y10T 156/1051* (2015.01); *Y10T 156/17* (2015.01)

(58) Field of Classification Search
CPC ....... G02B 6/4486; B29C 53/36; B29C 53/48; B29C 65/08; B31F 1/0061; Y10T 156/1008
USPC ........................................ 156/73.1, 199, 200
See application file for complete search history.

(56) References Cited

U.S. PATENT DOCUMENTS

| 5,076,881 A * | 12/1991 | Ferguson ............... G02B 6/448 |
| | | 156/179 |
| 6,450,678 B1 | 9/2002 | Bayersdorfer |
| 9,236,647 B2 * | 1/2016 | Longhurst .............. G01V 15/00 |
| 9,409,350 B2 * | 8/2016 | Hamlyn ................ B29C 70/382 |

FOREIGN PATENT DOCUMENTS

DE            197 24 486 A1    12/1998

* cited by examiner

*Primary Examiner* — James Sells
(74) *Attorney, Agent, or Firm* — Finnegan, Henderson, Farabow, Garrett & Dunner LLP

(57) ABSTRACT

A method for sheathing a light guide with a flexible layer of sheathing. The method includes providing a light guide and a sheathing strip. The sheathing strip is made of a flexible material. The method also includes joining the light guide and the sheathing strip using a forming aid to form a light guide-sheathing composite. The forming aid places the sheathing strip about the light guide, leaving two excess ends of the sheathing strip extending from the light guide. The method further includes feeding the light guide-sheathing composite to a connection unit and connecting the two excess ends to produce a mounting tab for the light guide-sheathing composite.

18 Claims, 3 Drawing Sheets

METHOD AND DEVICE FOR SHEATHING A LIGHT GUIDE

CROSS-REFERENCE TO RELATED APPLICATION

This application is based upon and claims the benefit of priority from German Patent Application No. 10 2012 216 333.6, filed Sep. 13, 2012, the entire contents of which are incorporated herein by reference.

TECHNICAL FIELD

The disclosure relates to a method and a device for sheathing a light guide with a flexible layer of sheathing.

BACKGROUND

It is known that light guides are also used for lighting the interior of motor vehicles. A light guide may be used to generate directly visible light beams, or be used to generate indirect lighting, which is also referred to as ambient lighting.

Conventionally, a light guide for direct or ambient lighting may be clipped to an interior part of a motor vehicle. Alternatively, as disclosed in DE 197 24 486 A1, the light guide may be sewed or glued via a mounting tab. To that end, the light guide is first provided with a sheathing. The light guide is wrapped in a flexible material, creating two excess ends that are then connected to form a mounting tab.

The sheathing needs to be placed tightly around the light guide. In doing so, high sensitivity of the light guide to mechanical and thermal damages needs to be taken into consideration, because the homogeneity of the light propagation and luminous radiation may be reduced if the surface of the light guide is damaged. In addition, the mounting tab needs to remain sufficiently flexible to facilitate sewing or gluing of the sheathed light guide.

SUMMARY

One object of the disclosure is to provide a method and a device for sheathing a light guide with a flexible layer of sheathing, resulting in a stable connection between the light guide and the layer of sheathing without interfering with the homogenous light propagation and luminous radiation.

According to a method consistent with the disclosure, a light guide and a sheathing strip made of a flexible material are provided. For example, the light guide may be made of PC or PMMA. The sheathing strip may be made of a transparent textile, a foil, or a film. In some embodiments, the sheathing strip is made of a synthetic textile. In some embodiments, the material for the sheathing strip (hereinafter also referred to as the sheathing material) has certain properties that facilitate connecting the excess ends to form a mounting tab at low temperatures. Connecting the excess ends at low temperatures may avoid any damage to the light guide resulting from, for example, high welding temperatures. In some embodiments, the sheathing material is resistant to dirt so as to produce a durable sheathed light guide with a lasting homogenous luminous radiation. In this disclosure, the term "homogenous luminous radiation" does not necessarily mean a steady luminous radiation. Rather, it means that the properties of the luminous radiation are the originally intended properties, i.e. that they are not influenced by any undesired damage during the sheathing process, an aging process, etc.

The light guide and the sheathing strip may be joined by using a forming aid. In some embodiments, the sheathing strip is positioned closely about the light guide, especially also at the points where the two excess ends of the sheathing strip remain. The excess ends, when viewed in cross-section, extend away from the light guide. In other words, the method consistent with the disclosure includes guiding the light guide so the sheathing strip folds about the light guide. The precise guiding of the light guide relative to the sheathing strip facilitates a firm connection, thus avoiding the risk of mechanical damage to the light guide. In some embodiments, the forming aid is electrostatically grounded to avoid attracting dust or unwanted material. The forming aid is part of the device according to the disclosure for producing a sheathed light guide.

The combination of the light guide and the sheathing strip (hereinafter also referred to as the light guide-sheathing composite) is directed to a connection unit where the two excess ends are connected, creating a mounting tab that, when viewed in cross-section, extends away from the light guide. The connection of the two excess ends does not have to be very pronounced because the light guide-sheathing composite is subsequently sewed or glued, or otherwise attached. The connection unit is also part of the device according to this disclosure.

The removal of the sheathed light guide may be accomplished by means of a hitch or a pulling tool, for example, with a driven roller to roll up the light guide-sheathing composite.

The method and device according to the disclosure create a defined, even, and firm sheathing for the light guide, with the probability of any damage to the light guide during the sheathing process being minimized. An additional fastening between the sheathing and the light guide, for example by gluing the sheathing and light guide together, is not necessary. The produced light guide-sheathing composite may then be sewed or glued to, or otherwise fastened to, the decorative surface of an interior part of the motor vehicle. The decorative layer may be a leather layer or a layer of faux or synthetic leather, or a material similar to leather. In some embodiments, the decorative layer may also include synthetic materials, textiles, or other suitable decorative surfaces that may be provided with a light guide.

In some embodiments, the forming aid has a funnel-like part to effect a precise joining of the sheathing strip and the light guide in a gentle manner. The funnel-like part wraps the sheathing strip about the light guide and positions the sheathing strip relative to the light guide, as well as the light guide and the sheathing strip relative to the connection unit. Therefore, the forming aid having the funnel-like part facilitates a precise leading and therefore an exact connection of the excess ends. In some embodiments, the funnel-like part has an opening at the end directed toward the connection unit. The opening includes a cylindrical opening followed by a slot through which the excess ends run. The cylindrical opening has a diameter approximately equaling the diameter of the light guide. The slot determines the orientation of the excess ends.

In some embodiments, the forming aid or the connection unit has a guide roller, which is provided with a groove along its outer circumference to accommodate the light guide. In some embodiments, each of the forming aid and the connection unit has a guide roller. The guide roller ensures even more dependability that a precise and damage-free connection process will be performed. In some embodiments, the forming aid includes the funnel-like part and the connection unit includes a guide roller in the connection unit. The interaction of the two guide means facilitates a precise and damage-free connection process.

In some embodiments, the flexible material of the sheathing strip is a textile. The textile may be a synthetic textile such as PET. Other textiles such as PA6, PA6.6, PE, etc. may also be used. Flexible textile sheathings allow a three-dimensional placement of the light guide. The textile is completely or partially permeable to light and may be a monofilament fabric so as not to interfere with the homogeneous impression of the light emission. In some embodiments, the textile is a bias tape textile, which may soften the tolerances in the process. In some embodiments, the thickness of the textile is between about 0.10 mm and about 0.13 mm. In some embodiments, the textile is dyeable, colorfast, or UV-stable. In some embodiments, the melting temperature of the textile is greater than 85° C., or greater than 120° C. In view of the service life of the light guide-sheathing composite, the textile may be resistant to chemical cleaning agents. The textile may be developed as plain weave or other types of weaves, such as a twill weave. In some embodiments, cutting edges are heated or singed by means of hot cropping or lasing.

Alternately, the sheathing may also be accomplished with a foil or a foil-like material. In doing so, like all other sheathing materials, the refractive index of the sheathing strip needs to be smaller than the refractive index of the light guide so as to meet the condition for total reflection. Moreover, the material of the light guide may be in direct contact with the sheathing. In this way, the sheathing provides a synergistic effect in that it is provided not only for fastening and as protection against damage or other external influences, but in addition also functions as a cladding layer. In that case, it is not necessary to provide a separate cladding layer. An example of such a combination is a light guide-sheathing composite where the actual light guide is injection molded of PC and the sheathing is provided of PMMA, with the refractive index $N_{PC}$ of the PC layer being 1.53 and the refractive index $N_{PMMA}$ of the PMMA layer being 1.49, which meet the condition for total reflection. In some embodiments, a PMMA fiber with a diameter between about 0.2 to about 3.0 mm is used as the light guide.

In some embodiments, the light guide has one or a plurality of roughened or napped areas. The roughened or napped areas may be in the shape of lines and extend along the longitudinal direction of the light guide. If a plurality of roughened or napped lines or areas are provided, the light properties of the light guide, especially with respect to rotation of the light guide relative to the sheathing, may be developed invariantly or at least less delicately. Roughening or napping the light guide provides areas where the light is uncoupled. The characteristics of the radiated light can therefore be adjusted with the type and manner of the roughening or napping.

In some embodiments, the two excess ends of the sheathing strip are connected to form a mounting tab by means of welding, such as, for example, ultrasonic welding. Alternatively, other methods may also be used, such as gluing. If gluing is used, it is important to ensure that the mounting tab does not harden. Furthermore, it needs to be ensured that the light guide does not come into contact with the glue because this may lead to the generation of light spots and a deterioration of the light properties. The gluing may be done by means of hot melt, dispersion, solvent adhesive, fusing tapes, or fusing threads or by means of double-sided adhesive tape. Furthermore, the excess ends may also be connected mechanically by means of a delicate hook closure or by means of clasps. The excess ends may also be grouted, or welded by means of thermal and/or mechanical deformation. Furthermore, the excess ends may be sewed to produce the mounting tab. A laser connection, an infrared welding connection, a hot stamp connection, or a connection by means of a weaving process is also possible. In some embodiments, ultrasonic welding is used, which may accomplish a stable connection in a simple way and in a mechanically gentle manner for the light guide. The connection may be continuous over the entire length of the light guide. Alternately, the connection may have interruptions.

In some embodiment, cooling is provided for the light guide during the connecting. In the case of ultrasonic welding, this can be implemented by means of a sonotrode and a counter-bearing or thrust bearing, such that the sonotrode and/or the bearing of the sonotrode may be cooled. Doing so not only reduces damages to the light guide attributable to an increased temperature, but also reduces the clogging of the sonotrode with traces or welding residue of the sheathing material over time.

In some embodiments, the sonotrode is rotatably mounted, with the axis of rotation of the sonotrode being arranged essentially perpendicular to the running direction of the joined light guide and sheathing strip. In some embodiments, the guide roller is developed as sonotrode. The excess ends are then led between the rolling sonotrode and the counter-bearing and thus put the sonotrode into a rotational movement. The rotatable sonotrode additionally prevents the formation of deposits on the sonotrode, caused by dirt or residual material. Furthermore, the rotational movement leads to a cooling effect because the sonotrode heats up only in the area that faces the counter-bearing.

In some embodiments, the distance between the sonotrode and the counter-bearing is variable so that the excess ends of the joined light guide and sheathing strip can be introduced into the connection unit with variable material strengths.

In some embodiment, a suction unit for suctioning off dust particles is provided, to prevent the dust particles from remaining in the sheathing strip after welding.

Methods and devices for sheathing a light guide with a flexible layer of sheathing have been described. Consistent with embodiments of the disclosure, the light guide-sheathing composite may be provided as a semi-finished product, which is connected to an interior part at another point. In some embodiments, for example, joining the excess ends to form a mounting tab may be performed simultaneously with connecting the light guide-sheathing composite with a decorative surface of an interior part of a motor vehicle. Although the disclosure is explained using the application in a motor vehicle as an example, the disclosure may also be implemented in other fields, such as, for example, transportation, such as aviation and shipping, furniture manufacturing, equipment and appliances building, etc. Furthermore, additional advantages and characteristics of the disclosure may be found in the description of embodiments below. The characteristics described there may be implemented alone or in combination with one or a plurality of the aforementioned characteristics to the extent that the characteristics do not contradict themselves. The following description of embodiments includes references to the attached drawings.

DETAILED DESCRIPTION OF THE EMBODIMENTS

Figure 1:
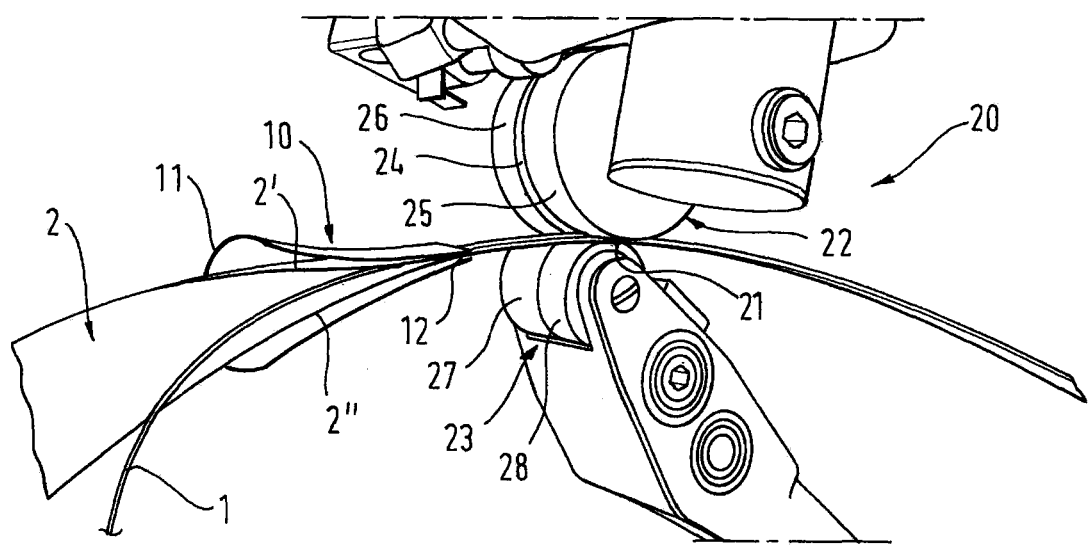
FIG. 1 is a three-dimensional view of a section of a device for sheathing a light guide with a flexible layer of sheathing.
Figure 2:
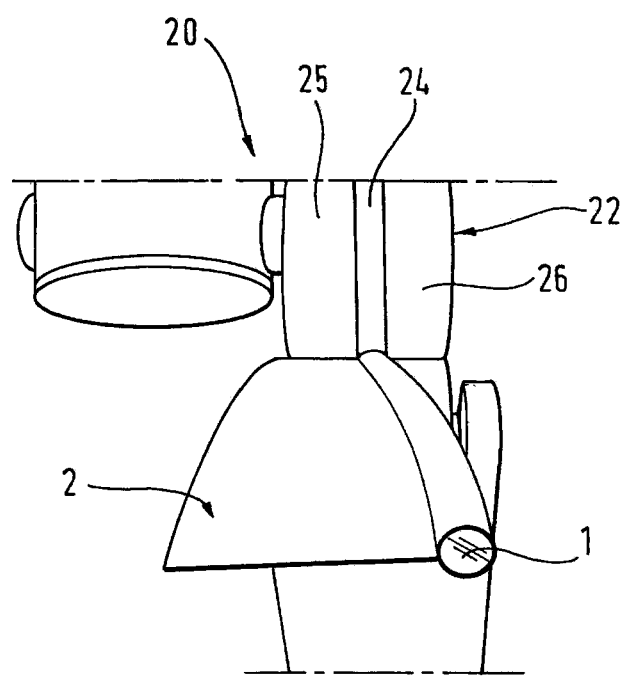
FIG. 2 shows the device of FIG. 1 from a different perspective.

FIG. 1 shows a section of a device for sheathing a light guide 1 with a sheathing strip 2. The device includes a forming aid 10 and a connection unit 20. The connection unit may be a welding unit. FIG. 2 shows the device from a different perspective.

Consistent with embodiments of the disclosure, the light guide 1 and the sheathing strip 2 are led to the forming aid 10, which positions and orientates the light guide 1 and the sheathing strip 2 relative to one another. In some embodiments, the forming aid 10 has an approximately funnel-shape, with a larger open area 11 at one side and a smaller opening 12 at the other side. The forming aid 10 is formed such that the sheathing strip 2 is folded about the light guide 1, to form two excess ends 2' and 2", which gradually come to lay on top of one another as they run through the forming aid 10 and finally run into one direction, approximately perpendicular to the paper level in FIG. 1. The opening 12 of the forming aid 10 includes a cylindrical opening approximately conforming to the light guide 1 and having a diameter similar to the diameter of the light guide 1. The opening 12 also includes a slot, through which the excess ends 2' and 2" of the sheathing strip 2, which are in parallel on top of one another, runs. In FIG. 1, the slot runs approximately in the direction perpendicular to the paper level. The cylindrical opening and the slot are more clearly shown in FIG. 4, which shows a larger section of a device for sheathing a light guide with a flexible layer of sheathing.

Figure 3:
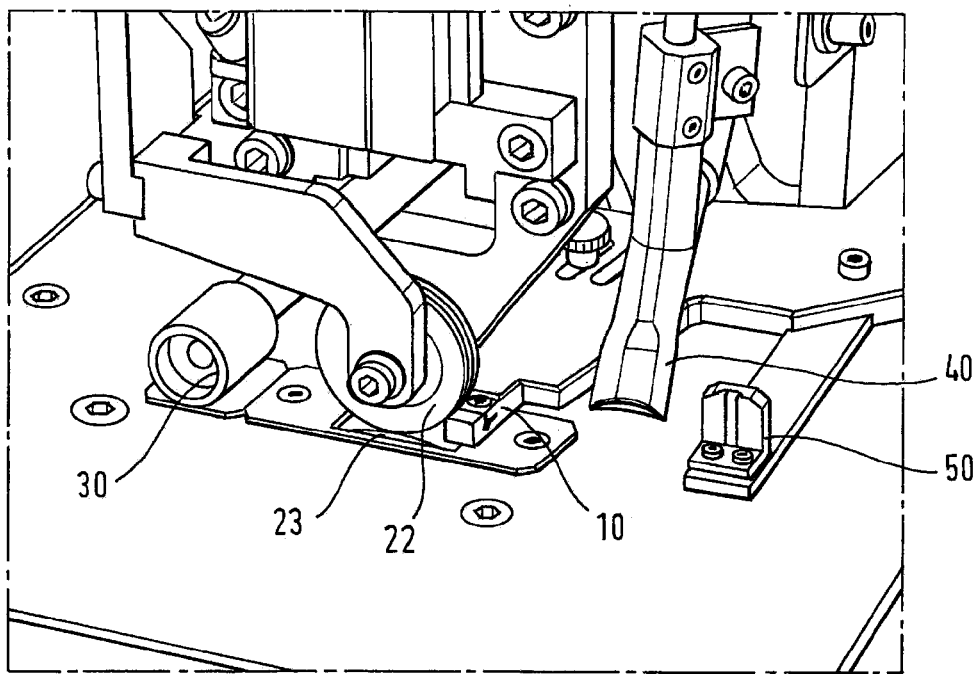
FIGS. 3 and 4 show other perspectives and details of a device for sheathing a light guide with a flexible layer of sheathing.
Figure 4:
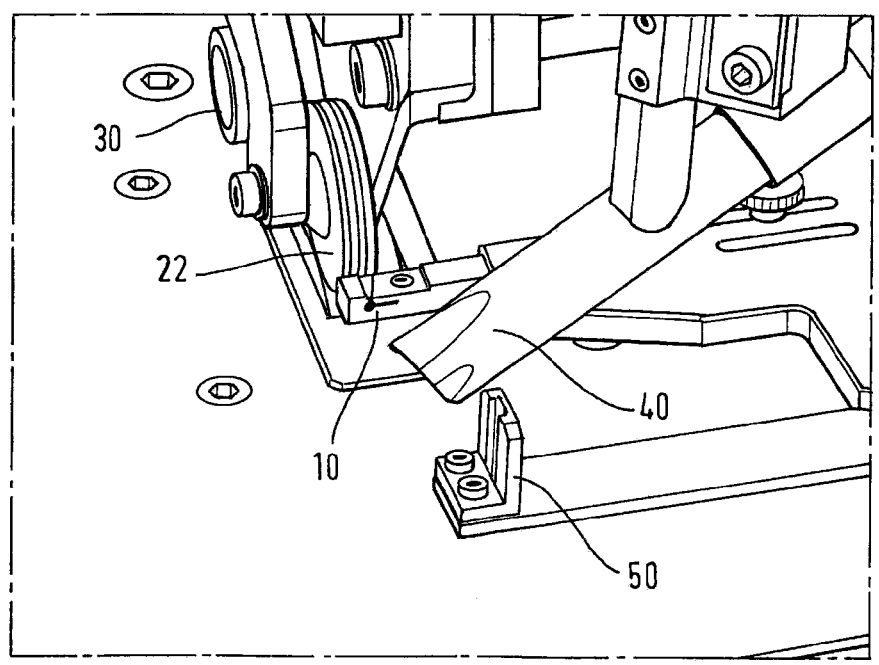

The composite of sheathing strip 2 and light guide 1, which has been reshaped in accordance with embodiments of the disclosure, is transported to the connection unit 20. In some embodiments, a bobbin coil former may be provided, for example, behind the connection unit 20 for transporting and/or coiling the light guide-sheathing composite. Such a bobbin coil former, also called a conveyor or a feeder, is not shown in FIGS. 1 and 2, but is shown in FIGS. 3 and 4 and has a reference symbol 30. The connection unit 20 has a guide roller 22 and a thrust bearing 23. The thrust bearing 23 may also be in the form of a roller. The light guide 1 and the sheathing strip 2 are joined between the guide roller 22 and the thrust bearing 23. For guiding and gentle welding, the guide roller 22 has a guide groove 24, in which the light guide 1 is guided. In some embodiments, the thrust bearing 23 also has a guide groove. Guiding the light guide 1 and the folded-over sheathing strip 2 is more clearly shown in FIG. 2. To adjust the guide roller 22 and the thrust bearing 23, both or one of them may be provided in a movable fashion at respective arms. Likewise, the forming aid 10 may be mounted in an adjustable fashion. The guide roller 22 has a welding area 25 and a guide area 26. These two areas are separated by the groove 24 and may be in one piece or in multiple pieces. An analogue differentiation between welding area 28 and guide area 27 may be provided at the thrust bearing 23. The term "guide area" is used here as a differentiation to the term "welding area." e.g., the area where the two excess ends 2' and 2" are joined. Therefore, extra means to guide the light guide-sheathing composite is not necessary.

Ultrasonic welding occurs in the welding area, i.e., at point 21. In this way, the two excess ends 2' and 2" are joined into one mounting tab.

In some embodiments, cooling may be provided in such a manner that the guide area 26 of the guide roller 22 and/or the guide area 27 of the thrust bearing 23 are cooled, which means that the welding is performed at a low temperature. Welding at a low temperature provides a gentle welding without thermal damage to the optical waveguide. Furthermore, it reduces a clogging of the guide roller 22 developed as sonotrode with traces or melt residue of the sheathing textile.

FIGS. 3 and 4 show a modified embodiment of the device for sheathing a light guide with a flexible layer of sheathing. Here, the forming aid 10 is shown less schematically. Furthermore, a device 40 for suctioning off dust particles, a conveyer 30 for transporting the light guide-sheathing composite, and a feed 50 for feeding the light guide and the sheathing strip are shown. The device 40 suctions off dust particles or lint so that they do not remain in the sheathing strip after welding. In the embodiments where synthetic materials are used, the device may also be grounded to reduce electrostatics generated during transporting of the synthetic materials that may attract dust.

The devices described above with reference to FIGS. 1 to 4 facilitate the sheathing of an optical waveguide, for example with a synthetic textile such as PET. The textile may have special properties for welding, which allow welding at low temperatures. In some embodiments, other textiles may be used. Consistent with embodiments of the disclosure, the textile may be light permeable and may be a monofilament fabric so as not to interfere with the homogenous impression of the light emission. In some embodiments, the textile is a bias tape textile. In some embodiments, the textile may also be provided in a "straight" fashion. In the latter case, the tolerances of the processes are slightly greater. The textile may not be fragile. The thickness of the textile may be between about 0.10 mm and about 0.13 mm, but may differ in other applications. The textile may be resistant to dirt, be dyeable, be colorfast, or be UV-stable to satisfy the high quality requirements in the automotive industry. The melting temperature of the textile may be above about 85° C., or above about 120° C. The textile may be resistant to chemical cleaning agents. The textile may be plain weave or twill weave, for example. Furthermore, the cutting edges should not fray. In some embodiments, the cutting edges of the textile may be singed off with hot cropping or lasing.

The welding process according to some embodiments of the disclosure includes leading the light guide 1, folding over the sheathing strip 2, and welding by means of ultrasound. In some embodiments, the textile is welded close to the light guide 1 to ensure the precise positioning of the light guide 1. The forming aid 10 facilitates a precise guiding and prepares for an exact welding. The precise guiding of the light guide 1 further prevents mechanical damages to the light guide 1, which may have a disadvantageous effect on the homogeneity of the luminous radiation. The guide roller 22 of the connection unit 20 helps to ensure an undamaged sheathing. The welding is done at low welding intensity, i.e., a soft welding. The close-fitting textile sheathing of the light guide 1 is achieved by the interaction of the forming aid 10 and the connection unit 20. During the welding, cooling may be provided to avoid an overly high temperature stress on the light guide 1 during the process. In some embodiments, a cooling of the sonotrode may be provided in case of ultrasonic welding, which reduces clogging of the sonotrode over time with traces or melt residue from the sheathing textile. The fastening of the excess ends 2' and 2" for producing the mounting tab is not necessarily very pronounced and may be removed relatively easily. This may be sufficient because there are subsequent fastening processes, such as the sewing of the light guide-sheathing composite.

In addition to the welding described above, other connection methods may also be employed. For example, the excess ends 2' and 2" may be glued together by means of hot melt, dispersion, a solvent adhesive, fusion tapes and/or fusion threads, double-sided adhesive tapes, etc. In some embodiments, a connection may be accomplished by a delicate clasp closure. The connection may be achieved by means of grouting or welding, by means of thermal or mechanical forming, sewing, lasing, IR welding connection, hot stamp connection, and/or weaving processes.

The invention claimed is:

1. A method for sheathing a light guide with a flexible layer of sheathing, the method comprising:
   providing a light guide and a sheathing strip, the sheathing strip being made of a flexible material;
   joining the light guide and the sheathing strip using a forming aid to form a light guide-sheathing composite, the forming aid placing the sheathing strip about the light guide, leaving two excess ends of the sheathing strip extending from the light guide;
   feeding the light guide-sheathing composite to a connection unit; and
   connecting the two excess ends to produce a mounting tab for the light guide-sheathing composite.

2. The method according to claim 1, wherein:
   the forming aid includes a funnel-like part, and
   joining the light guide and the sheathing strip includes folding, by the funnel-like part, the sheathing strip about the light guide to specify a positioning of the sheathing strip relative to the light guide and an orientation of the excess ends relative to the connection unit.

3. The method according to claim 1, wherein the forming aid includes a guide roller having a groove configured to accommodate the light guide along an outer circumference of the guide roller.

4. The method according to claim 1, wherein the connection unit includes a guide roller having a groove configured to accommodate the light guide along an outer circumference of the guide roller.

5. The method according to claim 1, wherein the flexible material includes a textile.

6. The method according to claim 5, wherein the textile includes a synthetic textile.

7. The method according to claim 1, wherein connecting the two excess ends includes connecting the two excess ends by welding.

8. The method according to claim 7, wherein connecting the two excess ends includes connecting the two excess ends by ultrasonic welding.

9. The method according to claim 8, wherein connecting the excess ends by ultrasonic welding includes using a sonotrode and a thrust bearing for the ultrasonic welding.

10. The method according to claim 9, further comprising: cooling the sonotrode.

11. The method according to claim 9, further comprising: cooling the thrust bearing.

12. The method according to claim 9, wherein the sonotrode is rotatably mounted.

13. The method according to claim 9, wherein a distance between the sonotrode and the thrust bearing is variable.

14. The method according to claim 1, further comprising: cooling the light guide during the connecting.

15. The method according to claim 1, wherein joining the excess ends includes one of gluing, grouting, or sewing the excess ends.

16. The method according to claim 1, wherein the sheathing strip is configured to form a cladding layer for the light guide.

17. The method according to claim 1, wherein the light guide is made of PMMA.

18. The method according to claim 1, wherein the light guide is napped along an extension of the light guide to form one or more lines.

* * * * *